(12) United States Patent
Pentel

(10) Patent No.: US 6,425,524 B2
(45) Date of Patent: *Jul. 30, 2002

(54) REMOTE ORDERING DEVICE

(76) Inventor: Randolph M. Pentel, 815 Deer Trail Ct., Mendota Heights, MN (US) 55118

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/384,961

(22) Filed: Aug. 27, 1999

Related U.S. Application Data (63) Continuation-in-part of application No. 09/062,093, filed on Apr. 17, 1998, now Pat. No. 5,969,968.

(51) Int. Cl.[7] .................................. G06F 7/08
(52) U.S. Cl. ................ 235/381; 235/380; 235/383
(58) Field of Search ........................... 235/375, 380, 235/381, 383, 384

(56) References Cited

U.S. PATENT DOCUMENTS

| | | | |
|---|---|---|---|
| 4,300,040 A | 11/1981 | Gould | |
| 4,414,467 A | 11/1983 | Gould | |
| 4,449,186 A | 5/1984 | Kelly | |
| 4,569,421 A | 2/1986 | Sandstedt | |
| 4,654,482 A | 3/1987 | DeAngelis | |
| 4,675,515 A | 6/1987 | Lucero | |
| 4,722,053 A | 1/1988 | Dubno | |
| 5,003,472 A | 3/1991 | Perrill et al. | |
| 5,055,660 A | * 10/1991 | Bertagna et al. | ............ 235/472 |
| 5,128,862 A | 7/1992 | Mueller | |
| 5,235,509 A | 8/1993 | Mueller | |
| 5,319,542 A | 6/1994 | King, Jr. | |
| 5,353,219 A | 10/1994 | Mueller | |
| 5,371,348 A | * 12/1994 | Kumar et al. | ............... 235/472 |
| 5,465,291 A | 11/1995 | Barrus | |
| 5,539,159 A | 7/1996 | Protheroe et al. | |
| 5,664,110 A | 9/1997 | Green | |
| 5,845,263 A | 12/1998 | Camaisa et al. | |
| 5,905,248 A | 5/1999 | Russell et al. | |

FOREIGN PATENT DOCUMENTS

| | | |
|---|---|---|
| DK | 1424379 | 2/1976 |
| GB | 2196766 | 5/1988 |
| WO | WO 00/39722 | 7/2000 |

* cited by examiner

Primary Examiner—Karl D. Frech
(74) Attorney, Agent, or Firm—Nikolai & Mersereau, P.A.

(57) ABSTRACT

A generalized remote ordering apparatus for customer and employee use within a restaurant, auto repair facility, retail store, grocery store, airport, or other service facility, to place orders, determine the status of orders, access information, and allow the customer to pay the bill for goods and/or services either by cash or credit card comprises an input device having a keypad, a credit/debit card reader, a first memory, a first processor, and a transmitter. The input device is adapted to communicate with an ordering station having a receiver tuned to the transmitter. A second processor, located in the ordering station, is adapted to decode information received from the transmitter through the receiver and produce decoded information. A display is also provided in the ordering station and is adapted to display the decoded information. The ordering station also includes a second memory adapted to store item numbers and prices. A communications link from the ordering station to a point-of-sale system allows payment to be made by credit/debit card or by cash.

18 Claims, 9 Drawing Sheets

ENTER ITEM NUMBER

ENTER ITEM NUMBER 1 2

PRESS ENTER BUTTON

Fig. 7

HAMBURGER QUANTITY 0 2

PRESS ENTER

Fig. 8

1. HAMBURGER - 2
TOTAL:

$1.75

PRESS ENTER BUTTON

Fig. 9

PRESS ENTER TO ORDER ITEM
PRESS REMOVE TO REMOVE ITEM
PRESS FINISH TO END $1.75

Fig. 10

YOUR TOTAL IS:

$4.73

PLEASE PULL FORWARD

Fig. 11a

| ITEM | SELECTION | COUNT |
|------|-----------|-------|
| 01 | HAMBURGERS | 2 |
| 02 | FRENCH FRIES | 2 |
| 03 | MILK SHAKE | 1 |

|  |  |
|--|--|
| SUBTOTAL | $4.35 |
| TAX | $0.28 |
| TOTAL | $4.73 |

ENTER ITEM NUMBER TO REMOVE 0  1

PRESS ENTER BUTTON

Fig. 11b

| ITEM | SELECTION | COUNT | SUBTOTAL |
|------|-----------|-------|----------|
| 01 | HAMBURGERS | 2 | $2.05 |
| 02 | FRENCH FRIES | 2 | $1.30 |
| 03 | MILK SHAKE | 1 | $1.00 |

|  |  |
|--|--|
| SUBTOTAL | $4.35 |
| TAX | $0.28 |
| TOTAL | $4.73 |

ENTER ITEM NUMBER TO REMOVE 0  1

PRESS ENTER BUTTON

REMOTE ORDERING DEVICE

This is a continuation-in-part of U.S. Pat. Ser. No. 09/062,093, filed Apr. 17, 1998, now U.S. Pat. No. 5,969,968, entitled REMOTE ORDERING SYSTEM FOR RESTAURANT DRIVE-UP LANE.

BACKGROUND OF THE INVENTION

This invention relates to a remote ordering system for a restaurant drive-through lane.

The drive-through lanes in many restaurants have added a very beneficial feature for both the consumer and the proprietor. The drive-through allows the proprietor to remain open longer, while the restaurant is being cleaned for the next day. The drive-through also allows more efficient handling of customers with a reduction in staff count.

The customer gets the benefit of staying in his or her vehicle while being serviced. This is especially important to young families and to those with mobility problems, such as the aged or infirm.

Drive-through lanes have been around for quite some time. However, in the typical drive-through lane, a customer places an order by speaking into a microphone to a an attendant. The quality of these microphones is generally poor, resulting in miscommunication and errors in the order. By the time the customer finds out about the error, he has already waited in line several minutes and must then wait several more minutes for a correct order to be filled. This results in the loss of customer goodwill.

A problem with previous drive-through ordering systems that do not use a microphone is that they require the customer to lean out of the vehicle to press a button on a menu or use a touch screen. This is awkward if not impossible for some people, such as very obese people. Also, this exposes the customer to rain, snow, etc. while the order is being placed. Generally speaking, there is no feedback as to the type, quantity, or total price of items ordered, and no capability to back up to correct an incorrectly-entered item.

There is a need for a remote ordering system for a drive-through lane that addresses the above problems. Additionally, the system should provide a completely transportable, hand-held remote device that can be assigned to customers who order frequently from the restaurant. Optimally, the device will have a customer identification which is transmitted with each order so that the restaurant can perform statistical analysis.

This application also relates to the use of a remote ordering device by wait staff within a restaurant, to place orders, determine the status of orders, and allow the customer to pay the bill either by cash or credit card.

This application also relates to a generalized remote ordering device for customer use inside or outside a facility such as a restaurant, auto repair facility, retail store, grocery store, airport, or other service facility. The remote ordering device is a handheld device that allows the customer to order products or services and access information.

There is a need for a hand held remote device on which a server in a restaurant enters each customer's food and beverage order and then electronically sends the information directly to the kitchen without the server having to personally take the order. Each server could handle additional tables more efficiently, increasing their income, and saving the restaurant staff salaries. The device can also have a credit card reader and signature "box" for the customer to complete the transaction at the table without having to wait in line at the cash register, or for the waitress to return with a credit slip to sign.

There is also a need for a generalized remote ordering device for customer use inside or outside a facility such as a restaurant, auto repair facility, retail store, grocery store, airport, or other service facility. The remote ordering device is a handheld device that allows the customer to order and pay for products or services and access information.

SUMMARY OF THE INVENTION

A generalized remote ordering apparatus for customer and employee use within a restaurant, auto repair facility, retail store, grocery store, airport, or other service facility, to place orders, determine the status of orders, access information, and allow the customer to pay the bill either by cash or credit card, comprising:

(a) an input device having a keypad, a credit/debit card reader, a power source, a first processor, and a transmitter; and (b) an ordering station having a wireless connection to said input device, said ordering station having a receiver tuned to said transmitter, a second processor adapted to decode information received from said transmitter through said receiver and produce decoded information, a display adapted to display said decoded information, a second memory adapted to store item numbers and prices, and a communications link to a point-of-sale system.

A principal object and advantage of the present invention is that it allows the customer to order items from a menu in a service facility without the necessity to speak to an attendant. This results in more accurate orders.

Another object and advantage of the present invention is that the server can immediately send the orders to the kitchen without having to personally deliver them. They can spend more productive time serving patrons, handle more tables, and thus save labor expenses.

Another object and advantage of the present invention is that the orders are received faster, and the server can be notified of completed orders as soon as they are prepared in the kitchen. Food will not get cool waiting for servers to pick it up.

Another object and advantage of the present invention is that the individual orders will be automatically entered on the restaurant computer system, to be used in inventory management, internal control, and marketing as desired. If the patron wishes to pay cash, or does not want to use a credit card, the order will be identified electronically at the check out register. If the restaurant wishes to have all patrons come to the check out register for control, the credit card slip and bill could already be completed saving time at the register. The tables that have prepaid could be identified at the check out register.

Another object and advantage of the present invention is that customers who are in a hurry can complete the credit card payment when the food is ordered, and not have to wait for the server to give them the bill. They could leave when they are finished eating.

Another object and advantage of the present invention is that kitchen staff could always read the order, because no handwriting is involved.

Another object and advantage of the present invention is that the server's orders and tips could be constantly recorded automatically, even if charged at the table.

Another object and advantage of the present invention is that each server could have their own ordering device, for easy identification in the kitchen or for personal notes in the jacket.

The above objects and advantages would be equally applicable for use by a customer at a service facility such as a restaurant, auto repair facility, retail store, grocery store, airport, etc.

The generalized remote ordering apparatus may also be used by the service facility to allow the customer to select a predetermined order and then enter it remotely. For example, the service facility may post an order code on a World Wide Web page that is correlated to a particular predetermined order. After accessing the Web page, the customer enters the order code into the input device and, while at the service facility, transmits the order code to the ordering station. The service facility may provide a menu of various order codes for standard orders for all customers. Alternatively, the customer's identification may be verified before providing an order code. The service facility may also require the customer to enter a credit card number before providing the order code.

DETAILED DESCRIPTION OF THE PREFERRED EMBODIMENTS

The remote ordering system for a restaurant drive-through lane of the present invention is generally designated in the Figures as reference numeral 10.

The remote ordering system 10 comprises an input device 12 and a drive-up ordering station 14. The input device 12 is unconnected to the drive-up ordering station 14, and the input device is used from inside the vehicle V. Preferably, the input device 12 is hand-held and is transportable away from the drive-up ordering station 14. Multiple devices 12 may be used, with a separate device being assigned to each customer. The input device 12 is preferably used within direct line-of-sight of the drive-up ordering station 14. That is, it is not intended that the devices operate while greatly separated, as for example over a telephone network.

Figure 3:
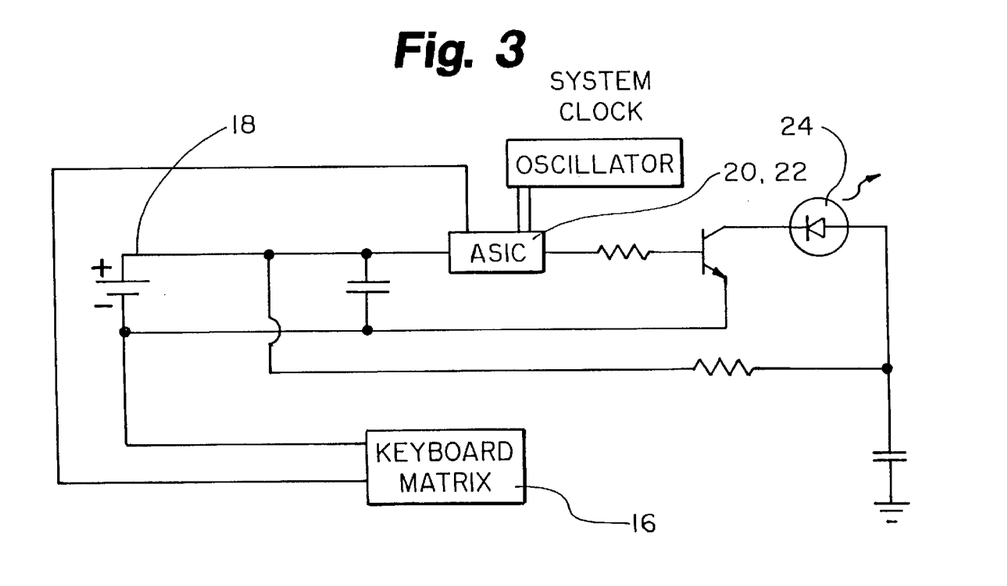
FIG. 3 is an electrical block diagram of the components of the remote hand-held device.

Preferably, the input device 12 has a keypad 16, battery 18, a first memory 20, a first processor 22, and a transmitter 24. The first memory 20 and first processor 22 may be discrete components, or they may both be in an Application Specific Integrated Circuit (ASIC) as seen in FIG. 3. A customer identification number may be stored in the first memory 20 for transmission to the drive-up ordering station with the order.

Figures 1, 1A:
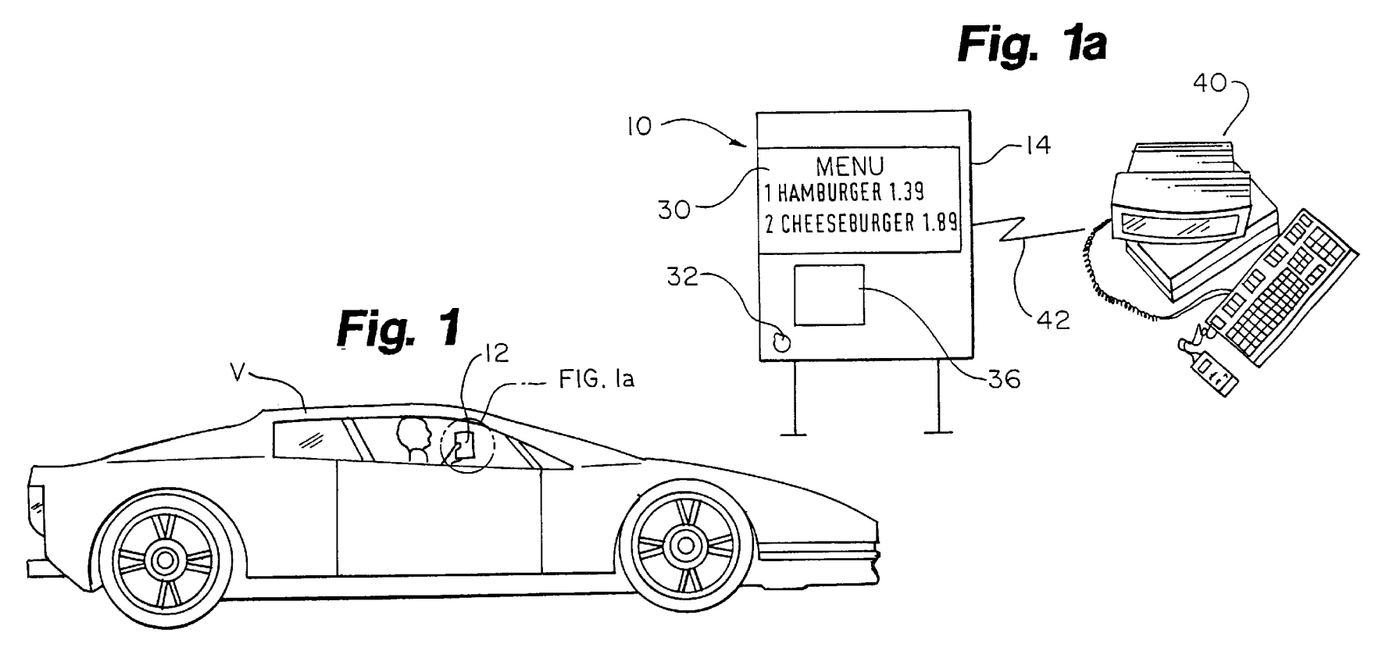
FIGS. 1 and 1a are schematics of the present invention in the context of a restaurant drive-through lane.
Figure 2:
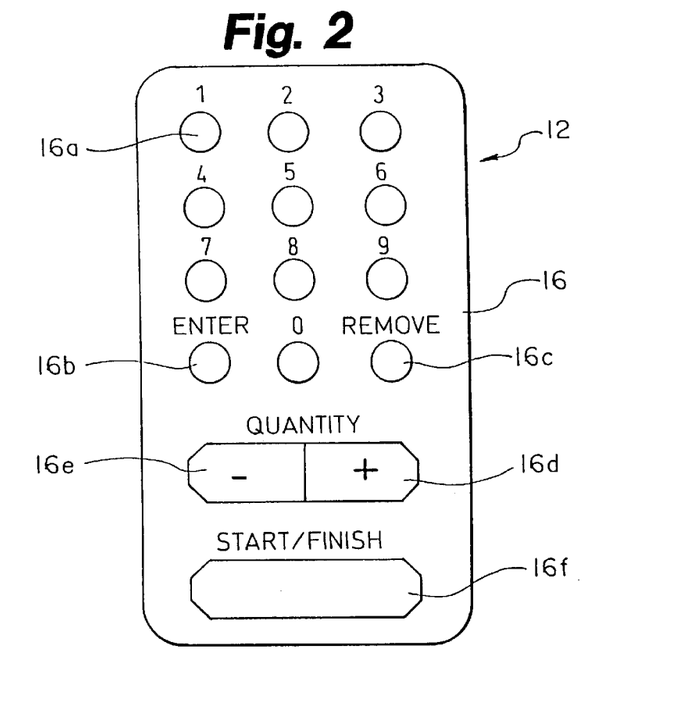
FIG. 2 is a schematic of the remote hand-held device of the present invention.

The keypad 16 further preferably comprises a number of numeric keys 16a, an enter key 16b, a remove key 16c, a quantity add key 16d, a quantity subtract key 16e, and a start/finish key 16f, as seen in FIG. 2.

Figure 4:
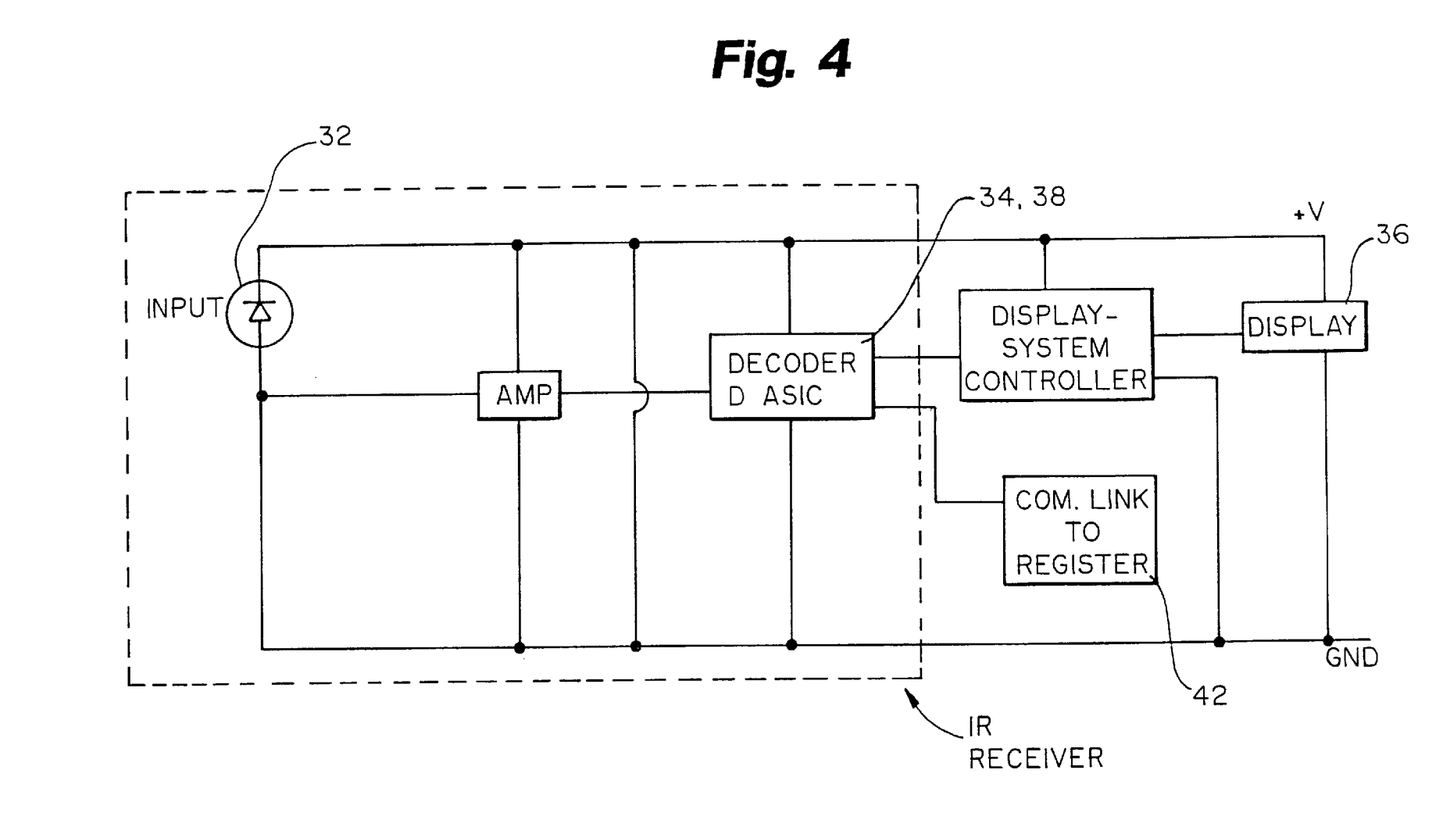
FIG. 4 is an electrical block diagram of the components of the drive-through station.

The drive-up ordering station 14 has a posted visual menu 30 which has the description and order number of various food items. A receiver 32 is tuned to the transmitter 24. The station 14 also has a second processor 34 which is adapted to decode information received from the transmitter 24 through the receiver 32 and produce decoded information. The decoded information, for example, item description and price, is displayed on a display 36. A second memory 38 stores item numbers, descriptions, and prices which may be received from a point-of-sale system 40 through a communications link 42. The second memory 38 and second processor 34 may be discrete components, or they may both be in an Application Specific Integrated Circuit (ASIC) as seen in FIG. 4.

The transmitter 24 and receiver 32 may operate either with radio frequency (RF) transmissions or with infrared (IR) transmissions.

Figures 5, 5A:
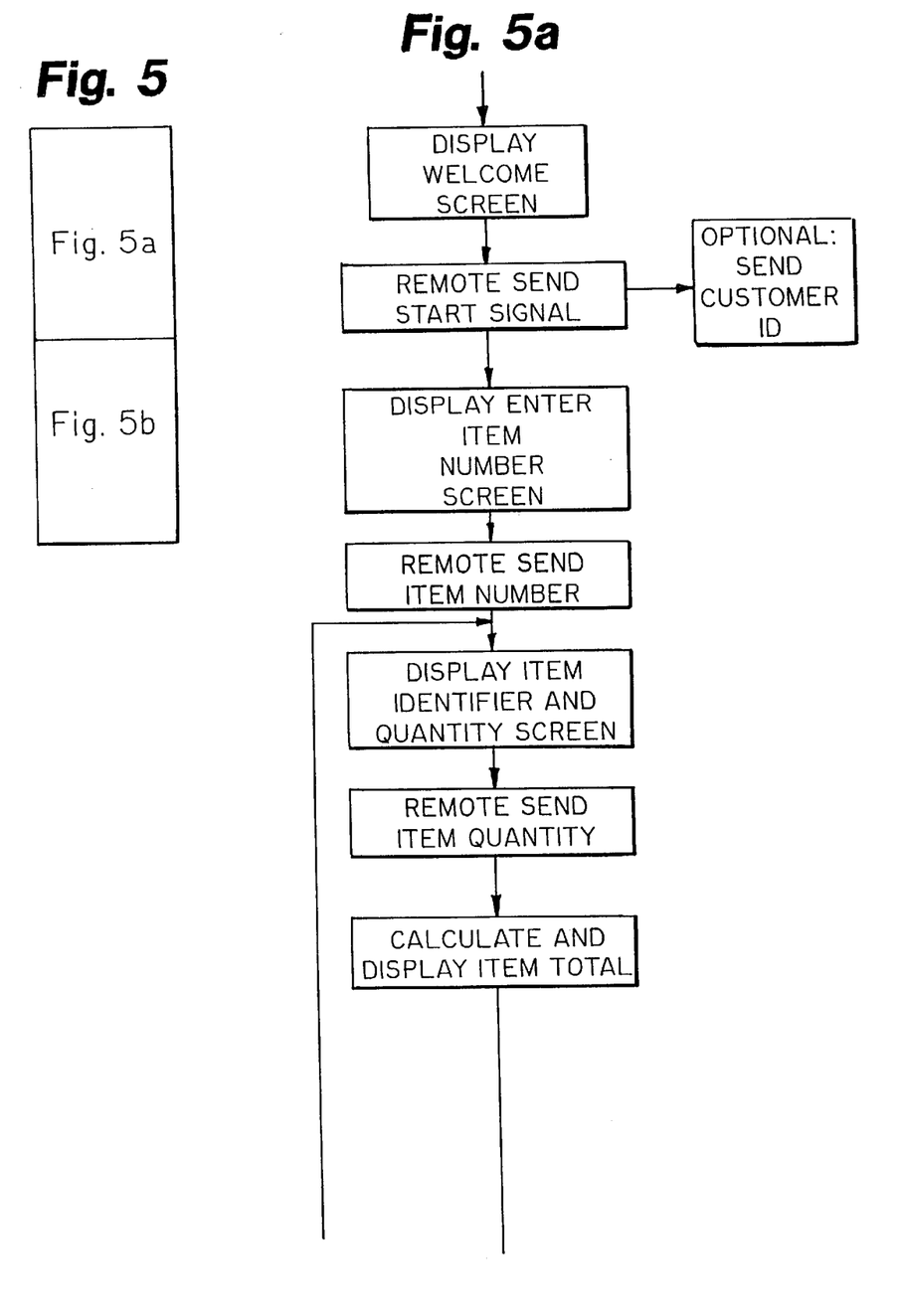
FIGS. 5, 5a, and 5b are flowcharts of the data processing method of the present invention.
Figure 5B:
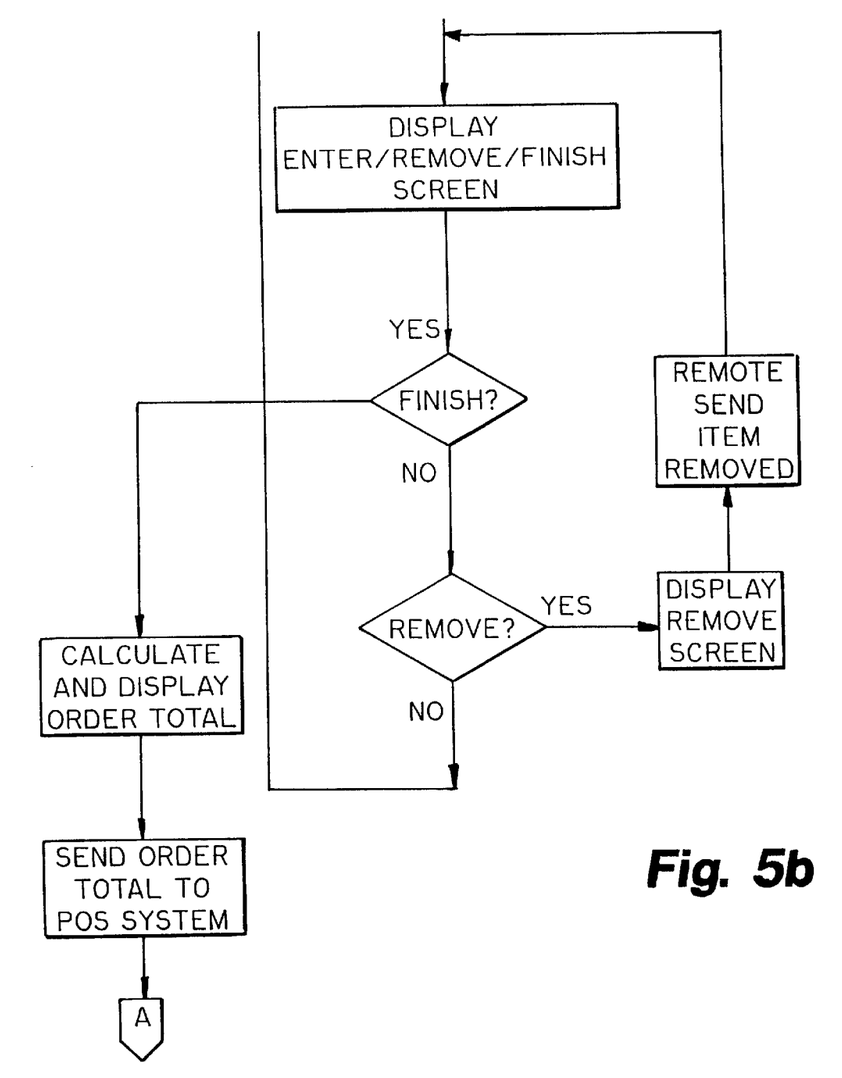

The remote ordering system 10 further comprises remote software executing in the first processor 22 and managing the remote input device 12; and ordering station software executing in the second processor 34 managing the ordering station 14. A flowchart of the remote software and ordering station software is shown in FIG. 5.

First, the ordering station software displays a "welcome" screen on the display 36. The welcome screen may invite the customer to initiate a transaction by pressing the start key 16f on the remote device 12.

The customer then presses the start key 16f on the remote device 12, causing a signal to be sent from the transmitter 24 to the receiver 32. The start signal is decoded by the ordering station software executing in the second processor 34. Optionally, a customer identification may be sent with the start signal or as a separate transmission.

Figure 6A:
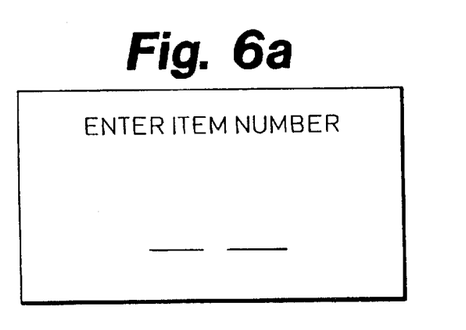
FIG. 6A is a schematic of an "enter item number" display.

In the next step, the ordering station software causes an "enter item number" screen (FIG. 6A) to be displayed on the display 36. The item numbers available to the customer will be shown on the posted menu 30 along with a description of the item (hamburger, cheeseburger, etc.) associated with the item number.

Figure 6B:
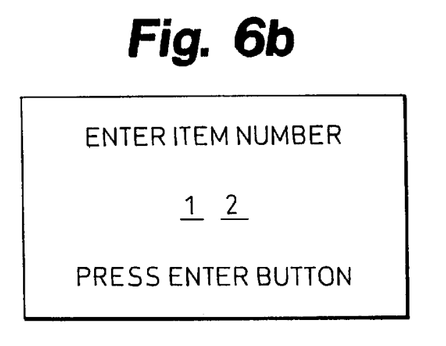
FIG. 6B shows the "enter item number" display after an item number has been entered.

In response to the "enter item number screen", the customer presses one or more of the numeric keys 16a to input the item number (FIG. 6B). The customer then initiates transmission of the item number to the ordering station 14 by, for example, pressing the "enter" key 16b.

The item number is received by the receiver 32 and decoded by the ordering station software executing in the second processor 34. The ordering station software then associates the item number with an item description by looking in a table held in the second memory 38.

Figure 7:
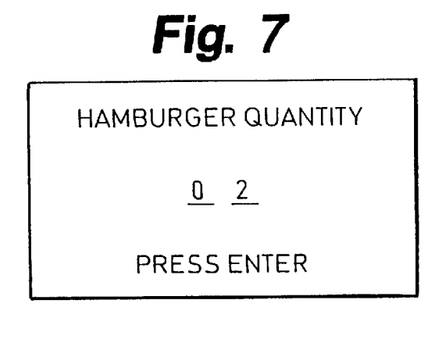
FIG. 7 is a schematic of an "item identifier and quantity" screen with the item quantity filled in by the customer.

Next, the ordering station software sends an "item identifier and quantity" screen (FIG. 7) to the display 36. This screen invites the customer to enter the quantity of this item desired.

The customer inputs the quantity of this item desired by using the numeric keys 16a and optionally the quantity add key 16d and/or quantity subtract key 16e. The customer then initiates transmission of the item quantity by, for example, pressing the "enter" key 16b.

Figure 8:
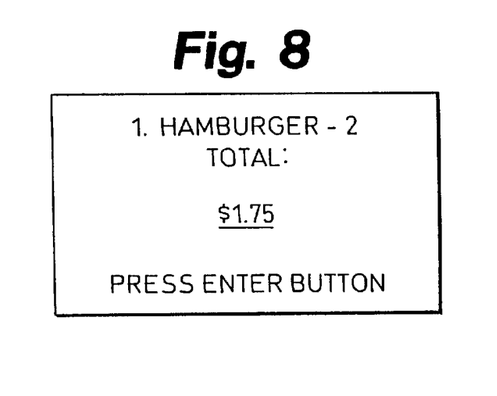
FIG. 8 is a schematic of an "item total" screen.

The receiver 32 receives the item quantity for the first item and passes this to the second processor 34 for decoding. The second processor then makes an entry for the quantity of the first item in the second memory 38. The second processor looks up the price of this item from a table maintained in the second memory 38 and calculates an item total for the first item. The ordering station software then transmits an item total screen (FIG. 8) for the first item to the display 36.

When the customer presses the "enter" key again, a transmission signaling pressing of the "enter" key is sent to the ordering station 14. The ordering station software then transmits an "enter/remove/finish" screen (FIG. 9) to the display 36.

Figure 9:
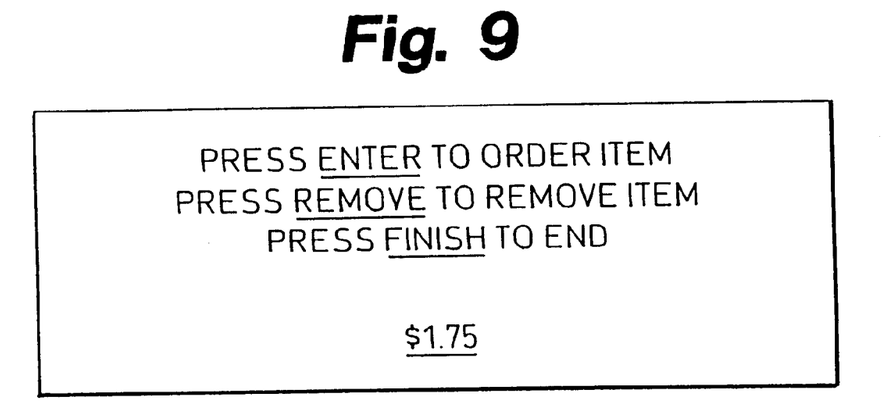
FIG. 9 is a schematic of an "enter/remove/finish" screen.

The customer has three choices by which he may respond to the "enter/remove/finish" screen.

If the "enter" key is pressed, the remote device 12 signals the ordering station 14 to bring up an "enter item number" screen (FIG. 6A) to begin the process described above for ordering another item.

Figure 11A:
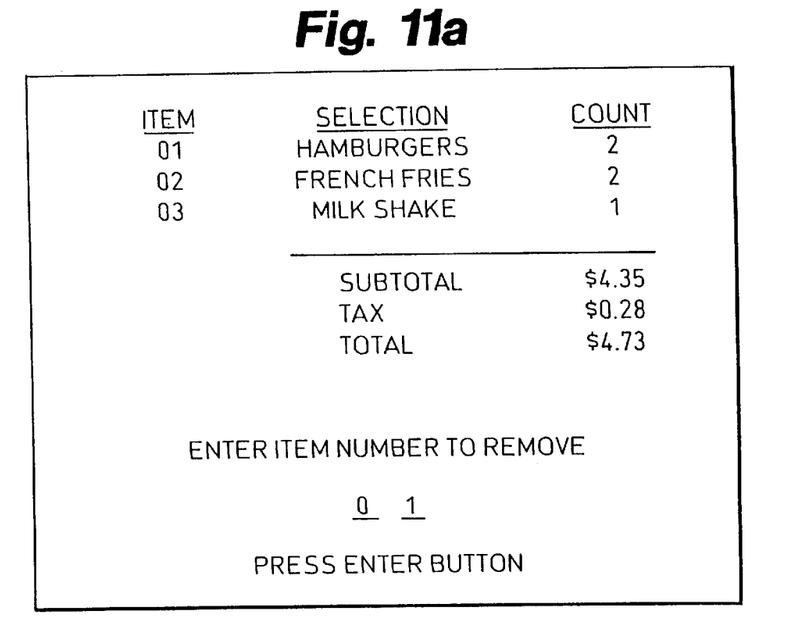
FIG. 11A is a schematic of one embodiment of a "remove item" screen.
Figure 11B:
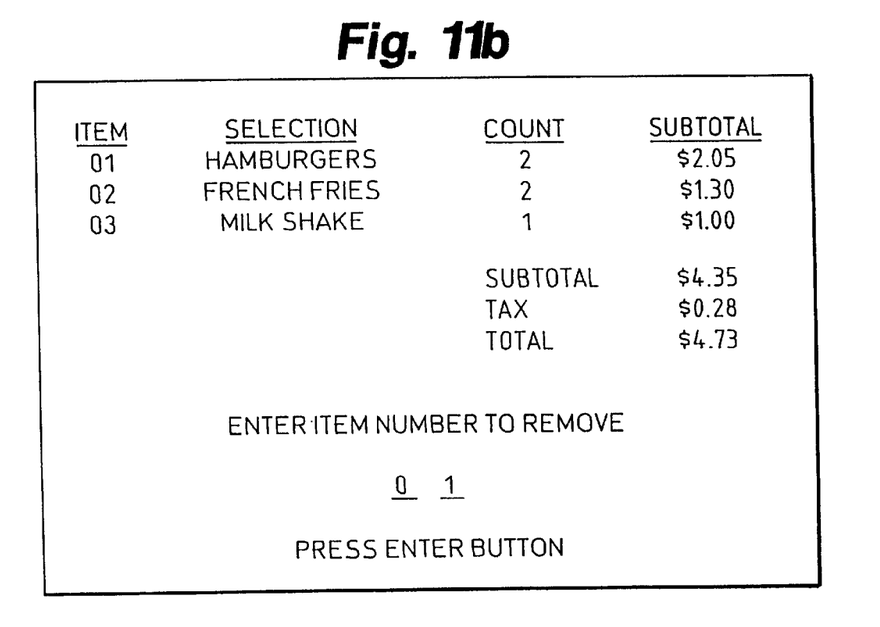
FIG. 11B is a schematic of another embodiment of a "remove item" screen.

If the "remove" key 16c is pressed, the remote device 12 signals the ordering station to bring up a "remove item" screen (FIG. 11A). This screen will list the item(s) ordered by item number, description, and quantity and display an order total. Optionally, the order subtotals may also be displayed (FIG. 11B). By using the numeric keys 16a, the customer indicates which item number to remove, then presses the "enter" key to signal the ordering station software to remove that item from the order. The ordering station software then redisplays the "enter/remove/finish" screen.

Figure 10:
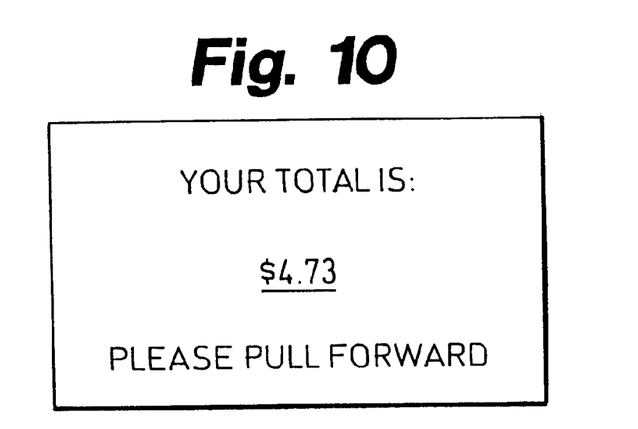
FIG. 10 is a schematic of an "order total" screen.

If the "finish" key 16f is pressed, the remote device 12 signals the ordering station to calculate an order total for all items and quantities ordered. The ordering station software then causes an order total screen (FIG. 10) to be displayed on the display 36.

The ordering station software then sends the order information to the point-of-sale system via the communications link 42.

The point-of-sale system may load item numbers, descriptions, and prices into the ordering station through the communication link 42.

Figures 12A, 13:
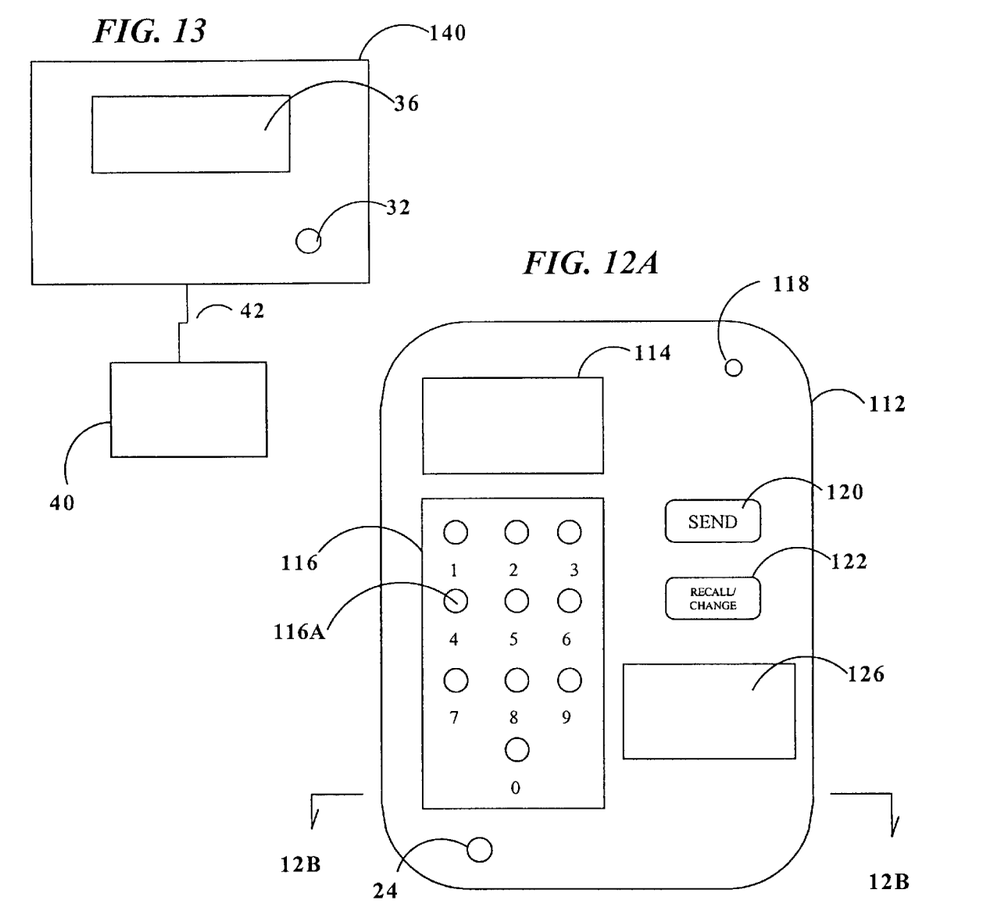
FIG. 12A is a schematic of an input device for a generalized remote ordering apparatus.
FIG. 13 is a schematic of an ordering station for a generalized remote ordering apparatus.

A generalized remote ordering apparatus comprises an input device 112 having a keypad 116, a battery 18, a first memory 20, a first processor 22, and a transmitter 24 (see FIGS. 3 and 12A). The first memory 20 and first processor 22 may be discrete components, or they may both be in an Application Specific Integrated Circuit (ASIC) as seen in FIG. 3. A user/server indicator may be stored in the first memory 20 for transmission to the ordering station 140 to identify the user/server.

The remote ordering apparatus further comprises an ordering station 140 unconnected to the input device 112, the ordering station 140 having receiver 32 tuned to the transmitter 24. The remote ordering station 140 also has a second processor 34 which is adapted to decode information received from the transmitter 24 through the receiver 32 and produce decoded information. The remote ordering station 140 also has a display 36 adapted to display the decoded information. A second memory 38 stores item numbers, descriptions, and prices which may be received from a point-of-sale system 40 through a communications link 42. The second memory 38 and second processor 34 may be discrete components, or they may both be in an Application Specific Integrated Circuit (ASIC) as seen in FIG. 4.

The input device 112 may have a display window 114 for displaying information. Preferably, the display window 114 is a liquid crystal display.

The input device 112 may have an order ready indicator 118 which is turned on by transmission from the ordering station 140 when an order is ready for pickup. Preferably, the order ready indicator is a lighted indicator such as an LED, but could also be a chime or vibrator.

The keypad 116 preferably has a plurality of numeric keys 116A to inputs elections from menu items and customer data. Most preferably, the numeric keys 116A further comprise keys labeled 0 through 9, as shown in FIG. 12A. For example, a standard telephone keypad could be used as the numeric keys 116A.

The keypad 116 further comprises an order send but ton 120 which is pressed to transmit an order to the ordering station 140.

The keypad 116 further comprises a recall/change button 122 which can be used to recall or change a previously submitted order by entering the order number and pressing the recall/change button 122.

Figure 12B:
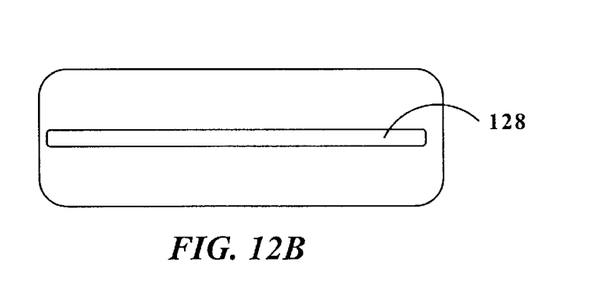
FIG. 12B is a schematic cross-section along the lines 12B of FIG. 12A.

The input device 112 preferably has a credit card slot 128 for swiping a credit card to read the magnetic strip on the credit card. The input device 112 may also have a credit card signature block 126 adapted to electronically record the signature of a credit card holder.

The transmitter 24 and receiver 32 may operate either with radio frequency (RF) transmissions or with infrared (IR) transmissions. Preferably, RF transmissions are used.

The remote ordering apparatus preferably comprises a plurality of the input devices 112, each of said plurality of input devices 112 being separately transportable away from the ordering station 140.

A customer of the service facility may place orders or acquire other information from the service facility by means of a method using the generalized remote ordering apparatus.

The service facility provides an order code to the customer who is using the input device, after correlating the order code to a predetermined order. For example, order code 1 could be correlated to a hamburger, fries, and a coke. The user of the input device then enters the order code into the input device 112 by means of the keypad 116 and presses the order send button 120, which causes the order number to be transmitted to the ordering station. The user may operate the input device 112 either inside or outside the service facility, depending on the range of the transmitter 24.

To provide order codes to the general public, the owner of the service facility may post a menu of order codes on a World Wide Web page. For example, if a retail store is having a special promotion, the store may post order codes for items which are on sale on its web site. The shopper then prints out a list of these order codes and, after entering the store, enters the order codes into the input device 112 and transmits them to the ordering station 140.

Alternatively, the service facility could also provide a catalog for use by a customer, with each customer being given an input device for shopping, and the catalog having the order codes. The input device 112 could be programmed to accept a number of order codes and transmit them serially to the ordering station 140 with one press of the order send button. When the order is ready, the order ready indicator will be turned on, and the customer may pick up the order.

In an alternative arrangement, the service facility may reveal an order code, on a web site or otherwise, only after verifying the identity of the requester, and may additionally require the requester to pay for the order with a credit card number before receiving the order code. In another arrangement, the requester pays for the order after entering it by swiping his credit card through the credit card slot 128, which transmits the credit card number and expiration date to the point-of-sale system through the ordering station 140.

The input device 112 may be incorporated into a cellular telephone, so that orders may be transmitted to the service facility over the telephone network.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A generalized remote ordering apparatus for customer and employee use with a service facility, to place orders, determine the status of orders, access information, and allow the customer to pay the bill either by cash or credit, comprising:

(a) a hand-held input device having a keypad, a credit/debit card data source, a power source, a first memory, a first processor, and a transmitter; and (b) an ordering station having a wireless connection to said input device, said ordering station having a receiver tuned to said transmitter, a second processor coupled to the receiver and adapted to decode information received from transmitter through said receiver and produce decoded information, a display adapted to display said decoded information, a second memory adapted to store item numbers and prices, and a communications link to a point-of-sale system, said point-of-sale system including a further communications link adapted to provide two-way communication with a credit/debit card payment authorization facility.

2. The remote ordering apparatus of claim 1, further comprising a plurality of said input devices, each of said plurality of input devices being separately transportable away from said ordering station.

3. The remote ordering apparatus of claim 1, further comprising a user/server indicator in said first memory, said user/server indicator being transmitted to said ordering station to identify the user/server.

4. The remote ordering apparatus of claim 1, further comprising a display window in said input device.

5. The remote ordering apparatus of claim 4, wherein said display window is a liquid crystal display.

6. The remote ordering apparatus of claim 1, further comprising an order ready indicator in said input device.

7. The remote ordering apparatus of claim 6, wherein said order ready indicator is a lighted indicator.

8. The remote ordering apparatus of claim 1, wherein said keypad further comprises a plurality of numeric keys adapted to input selections from menu items and customer data.

9. The remote ordering apparatus of claim 8, wherein said plurality of numeric keys further comprises ten keys labeled 0 through 9.

10. The remote ordering apparatus of claim 1, wherein said keypad further comprises an order send button.

11. The remote ordering apparatus of claim 1, wherein said keypad further comprises an order recall/change button.

12. The remote ordering apparatus of claim 1 wherein the credit/debit card data source comprises a credit card reader adapted to read the magnetic strip on a credit card.

13. The remote ordering apparatus of claim 1 wherein the input device further comprises a credit card signature block adapted to electronically record the signature of a customer paying by credit card.

14. The remote ordering apparatus of claim 1, wherein said input device communicates with said ordering station by radio frequency transmission.

15. A method of remote ordering using the remote ordering apparatus of claim 1, comprising the steps of:

(a) the service facility providing an order code to the user of the input device, the order code being correlated to a particular predetermined order; and (b) the user of the input device entering the order code into the input device, then transmitting the order code to the ordering station.

16. The method of claim 15, wherein the order code is provided on a World Wide Web page.

17. The method of claim 15, further comprising the step of verifying the user's identification before providing the order code.

18. The method of claim 15, further comprising the step of paying for the order code with a credit card number.

* * * * *